Aug. 22, 1961   W. F. WESTENDORP   2,997,623
SWITCHING APPARATUS
Filed April 1, 1960   3 Sheets-Sheet 1

Inventor:
Willem F. Westendorp,
by Richard R. Brainard
His Attorney.

Aug. 22, 1961 W. F. WESTENDORP 2,997,623
SWITCHING APPARATUS
Filed April 1, 1960 3 Sheets-Sheet 2

Inventor:
Willem F. Westendorp,
by Richard R. Brainard
His Attorney.

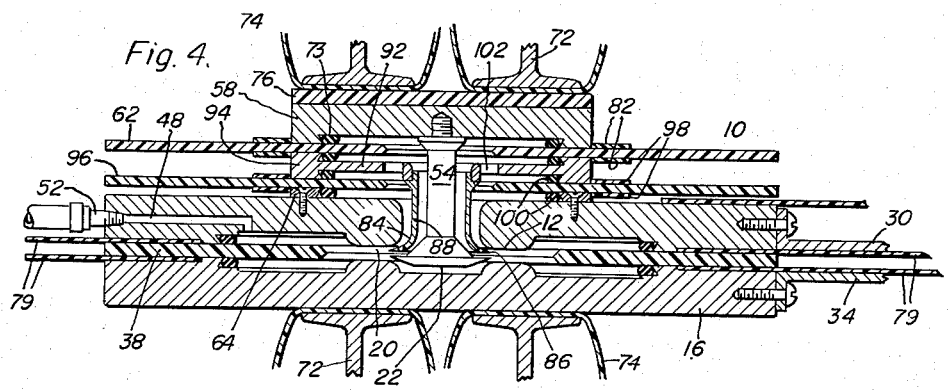
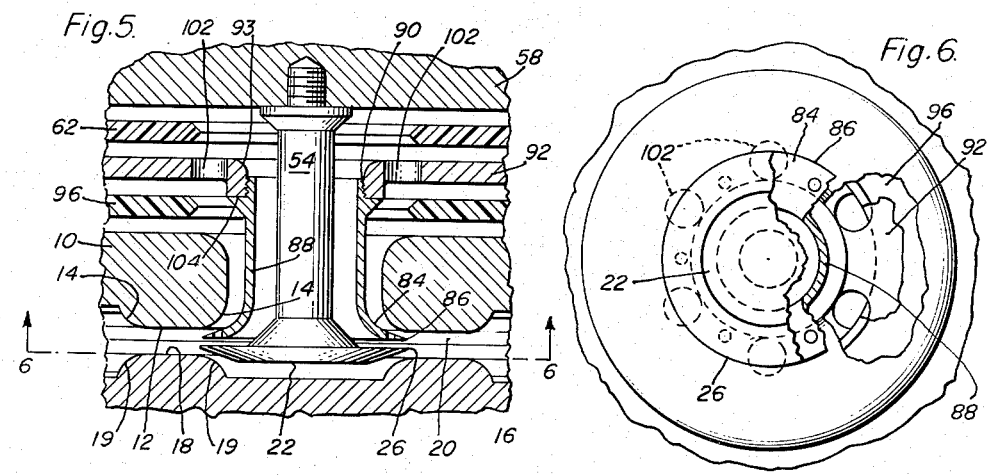
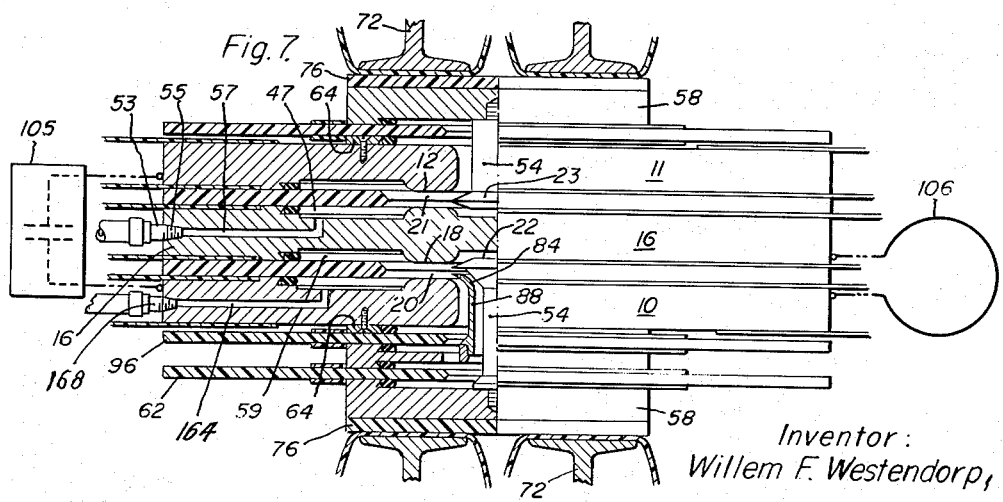
Inventor:
Willem F. Westendorp,
by Richard R. Brainard
His Attorney.

United States Patent Office 2,997,623
Patented Aug. 22, 1961

2,997,623
SWITCHING APPARATUS
Willem F. Westendorp, Schenectady, N.Y., assignor to General Electric Company, a corporation of New York
Filed Apr. 1, 1960, Ser. No. 19,316
18 Claims. (Cl. 315—36)

This invention relates to high current switching apparatus and more particularly to spark gap apparatus for transferring high energies at an accurately predetermined time.

A problem attendant with circuitry conveying high magnitude surge currents relates to the inductance of circuit leads, this inductance producing stored energy in magnetic fields around such leads, thereby preventing immediate delivery of this energy to a load. Inductance is proportional to magnetic flux linkages per ampere and in a complete circuit involving flat forward and return leads is proportional to the spacing between the leads while being inversely proportional to their width. It would be desirable then to space forward and return circuit leads as closely as possible to assure delivery of maximum energy to the load. However, many conventional switching devices including conventional spark gaps, because of their bulk, cause this spacing to be increased in the area of the switch, thereby deleteriously increasing circuit inductance. Length of the spark itself also adds to the inductance.

The inductance problem frequently occurs in high energy storage and discharge systems. A particular example involves a high temperature plasma study system requiring completion of a circuit from a 70 kilovolt capacitor bank to a single turn inductance coil wherein a current of a million and a half amperes is to flow from the capacitor bank to the induction coil as soon as the circuit is closed. A body of gas, termed plasma, ionized an instant before, is located within the inductance coil and is subjected by the resulting magnetic field to intense heat and pressure conditions. Similar circuit closure problems occur in the testing of large capacitors where large discharge currents are measured and recorded. For these applications a low inductance switching system would be highly advantageous to prevent a high voltage drop in the circuit leading to the load.

Another problem attendant to systems of this type is the requirement that the circuit be completed from the capacitor energy source to the inductance load at an accurately predetermined time; in the first example given, the circuit must be closed immediately after other means have ionized the gas within the inductance load. This latter timing must be on the order of microseconds, a requirement beyond the performance of prior high surge current spark gap devices.

In order to initiate a connection in a spark gap switching device, some sort of trigger electrode is usually positioned between the principal electrodes so that a voltage may be applied to the trigger electrode to electrically "break down" the area between the principal electrodes into an arc discharge. Prior spark gap devices have included trigger electrodes extending out of an aperture in a principal electrode across the electric field between the principal electrodes. Other devices require a third, annular principal electrode positioned between the arcing electrodes and apertured to receive a trigger electrode. The former method enlarges the gap spacing for a given voltage due to the added length required by the trigger electrode, thereby inherently increasing the circuit inductance. The latter type of device depends for its action upon ultra violet radiation from the aperture and is not susceptible of extremely accurately timed operation. Inductance is also deleteriously increased in the latter system because of the gap spacing taken up by the additional electrode. Furthermore, prior art systems have characteristically employed a wire-like triggering electrode subject to rapid burning by the initiated arc.

It is therefore an object of this invention to provide an improved high current switching device having a minimum inductance and which allows the inductance of the circuit to be likewise reduced, thereby permitting maximum energy transfer to a load.

It is another object of this invention to provide an improved high current switching device which may be accurately timed in its operation.

It is another object of this invention to provide an improved spark gap device wherein the trigger electrode is less subject to wear.

It is another object of this invention to provide an improved spark gap device which can be fired with a minimum voltage across its principal electrodes.

It is another object of this invention to provide an improved spark gap device which is simple and compact in construction and easily adapted and installed in a high current transfer circuit.

Briefly stated, in accordance with one aspect of the invention, a spark gap includes a pair of spaced opposed principal electrodes, creating therebetween an electrostatic field pattern composed of equipotential surfaces lying substantially parallel to the surfaces of said principal electrodes, at least in the area directly therebetween. A trigger electrode oriented toward the area directly between the electrodes, is disposed along one of said equipotential surfaces, and is maintained at a potential substantially equal to the equipotential surface along which it lies. The trigger electrode is provided with a relatively sharp leading edge in the direction of the gap between said principal electrodes, the edge being very effective in operation timing but which does not, however, cause a disturbance in the field normally existing between said principal electrodes. This trigger electrode is compact in the axial direction of the arc allowing close spacing of the principal electrodes thereby lowering the inductance of the arc and system.

According to an additional feature of this invention, the area between the principal electrodes and including the trigger electrode is enclosed and pressurized so that the voltage handling capabilities of the gap are increased, or alternatively, the spacing between the principal electrodes is decreased.

According to another feature of this invention, the principal electrodes are formed on flat plate conductors which are substantially extensions of close spaced flat plate parallel conductors used in a parallel line system, thereby decreasing the total circuit inductance and hence increasing the circuit's power transfer characteristics. This construction also allows ease of construction and pressurization.

In accordance with another feature of this invention a plurality of substantially parallel trigger electrodes is arranged between said principal electrodes for initiating an arc between said principal electrodes although the voltage between said principal electrodes may be considerably less than half the maximum standoff voltage.

The subject matter which I regard as my invention is particularly pointed out and distinctly claimed in the concluding portion of this specification. The invention, however, both as to organization and method of operation, together with further objects and advantages thereof, may best be understood by reference to the following description taken in connection with the accompanying drawings wherein like reference characters refer to like elements and in which:

FIGURE 4 is a cross-section of a two-trigger current transfer device in accordance with the present invention.

FIGURE 5 is a detailed view of the central portion of FIGURE 3, including the arc gap and trigger area.

FIGURE 6 is a cut-away view looking upward from the lower electrode in the FIGURE 4 detail.

FIGURE 7 is a cut-away view of a two-gap, three-trigger current transfer device according to the present invention, particularly applicable to a "crowbar" system.

In a complete energy transferring system involving flat forward and return conductors, circuit inductance may be calculated by the following formula:

$$L = 4\pi \times 10^{-9} \frac{sl}{w}$$

where $L$ is the inductance in henries,
$w$ is the width of the conductors in centimeters,
$l$ is their length in centimeters,
and
$s$ is the spacing between the conductors.

It is observed that the inductance of such an arrangement is proportional to the conductor spacing and inversely proportional to their width. If such a circuit is to transfer maximum energy without storing it unnecessarily in the inductive field of said conductors, it is desirable that the conductors be as wide as possible, and that they be spaced as closely together as their standoff voltage will permit.

It has been found most practical to employ flat plate conductors because this configuration permits the utmost minimizing of inductance as set out in the above formula.

Conventional arc gap constructions because of their bulk cannot be inserted in a circuit for switching purposes without severely altering the spacing between the leads and therefore increasing the circuit inductance. Furthermore, the arc discharge itself may introduce considerable inductance into the circuit since inductance is also proportional to flux linkages per ampere and proportional therefore to the length of a conducting arc path. A short arc discharge path will therefore contribute less inductance to the circuit than a long discharge path.

Figure 1:
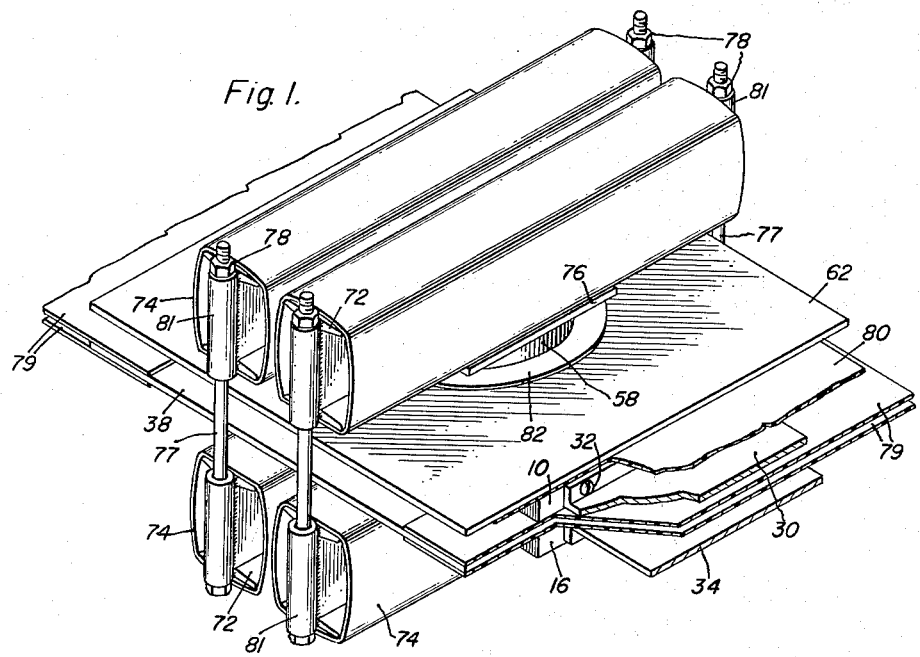
FIGURE 1 is a perspective view of a single gap, single trigger current transfer device according to the present invention.
Figure 2:
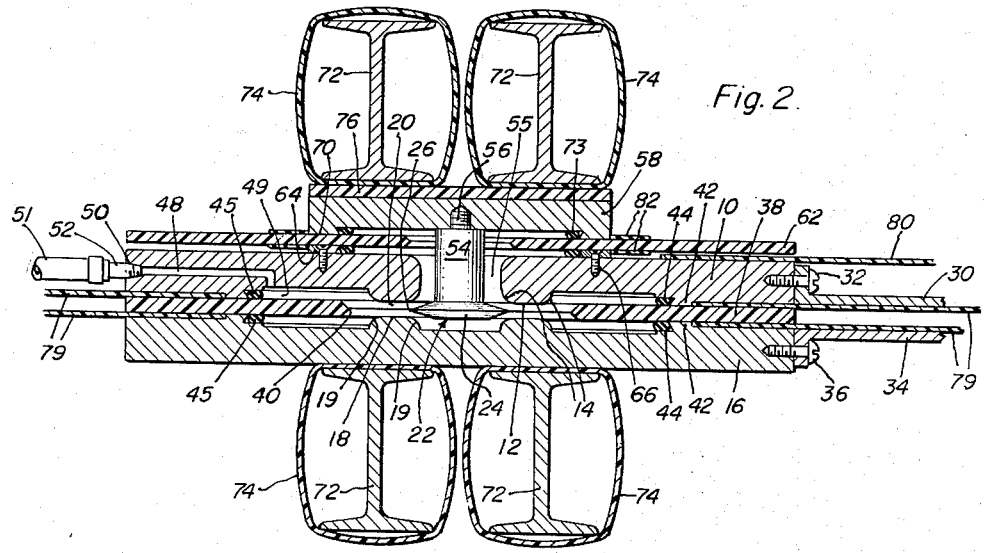
FIGURE 2 is a cross-section of the FIGURE 1 device taken along the center line in FIGURE 1 as viewed from the left.

Referring to the embodiment shown in FIGURES 1 and 2, it will be seen that a construction is achieved which possesses certain advantages including the reduction of inductance to a minimum. In the illustrated embodiment a relatively flat conducting plate 10 is provided with an annular raised portion 12 having curved edges 14 and an annular aperture 55 located within the annular raised portion 12, the aperture being spaced from conducting center post 54 to prevent arcing thereto. A second conducting plate 16 parallel to the first, is provided with an annular raised portion 18 having cruved edges 19 and aligned with raised portion 12 thereby defining therebetween a gap space 20. A radius of curvature for said curved edges 14 and 19 on the order of the gap spacing 20 has been found satisfactory for both annular raised portions 12 and 18. The term annular is generally taken herein to mean "describing a loop," and need not necessarily be circular.

A substantially flat trigger electrode 22 supported by conducting center post 54 is disposed between said plates and generally parallel thereto. The trigger's central portion 24 is tapered to a relatively sharp edge 26 oriented in the direction of gap 20 but removed from the central portion of gap 20 so that it will avoid most of the normal arc discharge path across the gap. The outside edge 26 of trigger electrode 22 is constructed to describe an outline that remains a relatively constant distance from gap 20 and from the attendant raised portions 12 and 18 forming the gap whereby a triggering discharge from the trigger electrode to one of the raised portions will occur anywhere along the extended edge of the trigger electrode. A pair of flat conducting leads 30 and 34 are secured to plates 10 and 16 in parallel fashion by means of screws 32 and 36. It is observed that the conducting plates 10 and 16 are substantially extensions of flat leads 30 and 34, the spacing between these conducting paths being increased but slightly in the area near raised portions 12 and 18 merely to prevent unwanted discharge where plates 10 and 16 are not separated by insulation.

In the specific embodiment, the conductors 30 and 34, as well as raised portions 12 and 18 defining the gap 20, are maintained at a spacing of ⅜ of an inch, allowing an open circuit 70 kilovolts to appear between the conductors and across the gap when the gap is suitably pressurized. The general purpose of the apparatus is to complete a circuit between plates 10 and 16. A trigger pulse is applied to trigger electrode 22, this trigger pulse having a voltage on the same order as the voltage appearing across the gap between raised portions 12 and 18. The raised portions are the principal electrodes of an arc gap across which an arc is formed when the trigger pulse is applied.

A large insulating board 38 spaces apart conducting plates 10 and 16. This insulating board can be composed of ⅜ inch thick glass cloth laminate impregnated with a plastic, for example, urea formaldehyde, melamine formaldehyde, or epoxy resin. The insulating board is extended outwardly and inwardly to provide a high creepage path between plates 10 and 16 but has a central aperture larger in diameter than the outside diameter of raised portions 12 and 18 to clear the arcing area. The aperture is tapered to an edge 40 in order to prevent splitting of the board 38 by the blast occurring when the arc discharge takes place. A bore 48 in plate 10 communicates to opening 49 between insulating board 38 and plate 10 and is threaded at its outer end 50 for insertion of threaded tube 52 attaching to a convenient source of compressed gas by means of hose 51. A source of nitrogen at a pressure of 150 to 200 pounds per square inch above atmospheric pressure is suitable. This pressurizing together with the gap construction decreases the allowable spacing across the gap from what would otherwise be allowable.

Both plates 10 and 16 are provided with an annular ridge 42 abutting insulating board 38, the ridge increasing in width towards board 38 to provide a canted inner recess radially engaging O-ring seals 44, employed to prevent pressure leakage from within the gap area. The seals may be composed of a suitable sealing material which is compressible, insulating, and preferably heat resistant. These O-ring seals are seated upon an annular shelf 45 adjoining the tapered ridge 42, this shelf having a height sufficient for compressing the O-ring seal against the insulating board 38.

Trigger electrode 22 is supported by and firmly attached to conducting post 54 extending vertically through aperture 55, such that trigger electrode 22 is disposed along what is termed an equipotential surface between the principal electrodes formed by raised portions 12 and 18. When a suitable voltage less than breakdown voltage is applied across these electrodes, an electrostatic field is established therebetween having its highest voltage gradient directly between the raised portions 12 and 18. The field may be described as containing a plurality of generally parallel equipotential surfaces spaced between the principal electrodes, each being the locus of points exhibiting a particular voltage. The potential surfaces near a principal electrode are similar in general contour to the nearby electrode; however, in the middle area of the gap, the surfaces are primarily at right angles to a perpendicular line drawn between the two principal electrodes at their closest point. Trigger electrode 22 is disposed along one of these surfaces with its edge directed toward the gap and is supplied with a quiescent voltage approximately equal to the voltage of the equipotential surface or an average of equipotential surfaces along which it lies. It is apparent that the trigger electrode may sometimes be thicker than an equipotential surface for a particular exact voltage. However, the electrode is disposed generally parallel to such surface.

Figure 3:
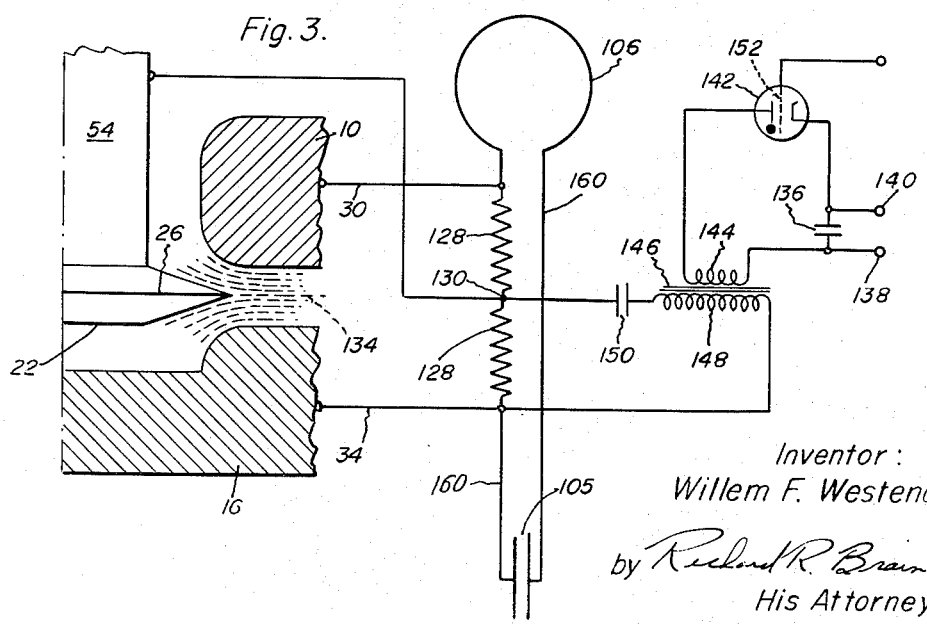
FIGURE 3 is a circuit diagram including a coupling arrangement for the spark gap trigger electrode according to the present invention.

The forward tapered portion of the trigger electrode is located opposite inner curved edges 14 and 19 of raised portions 12 and 18 in a region where the equipotential surfaces spread apart as the electrodes spread apart. It can be shown that the equipotential surfaces in this region spread with nearly a linear taper consistent with the taper of the trigger electrode, as illustrated in FIGURE 3.

The post 54 and electrode 22 may be integrally formed from brass rod material. Post 54 is provided with a threaded stud 56 at its upper end for securing the post to conducting trigger support member 58 having a mating threaded bore to receive stud 56. Trigger support member 58 provides a conducting medium for coupling a trigger pulse to the trigger electrode 22 and must therefore be appropriately insulated from plate 10. A second insulating board 62, which may be composed of the same material as insulating board 38, having a central ridged aperture spaced from post 54 is employed for this purpose. A tapered annular retaining ring 64 attached to plate 10 with metal screws abuts the insulating board 62 and confines a suitable pressure maintaining O-ring seal within its inner radius by means of an inner taper enlarging retaining ring 64 in width in a direction toward insulating board 62.

Trigger support member 58 has an outside axial flange 70 abutting insulating board 62, the flange increasing in width in the direction toward the insulating board to provide an inner cant for engaging O-ring seal 73. O-ring seal 73 seals this joint between flange 70 and insulating board 62 to prevent pressure leakage and is composed of a material suitable for this purpose.

I-beams 72, covered with polyethylene sheet material 74, are disposed at the top and bottom of a present apparatus for clamping the apparatus together against possible pressure leaks and the explosive force of the arc discharge. Upper I-beams 72 have their lower flange separated from trigger support member 58 not only by their enclosing polyethylene sheet 74 but also by means of a glass laminate plastic impregnated insulating board 76 inserted to prevent leakage of the trigger voltage pulse which may be applied to trigger support member 58. Eight metal tubes 81 of small inside diameter are welded axially along the web ends of I-beams 72 and have long bolts 77 inserted therethrough from a tube on an upper I-beam to a corresponding tube on a lower I-beam. Nuts 78 are drawn up tight on bolts 77 for securing the apparatus together in an axial direction.

Polyethylene sheet material 79 is inserted between plates 10 and 16 and insulating board 38 from annular ridges 42 past the outside edges of the apparatus to provide insulation extending between the outside leads connected to plates 10 and 16. Plates 10 and 16 are constructed to nearly abut board 38 in this area. A similar sheet of polyethylene sheet material 80 may be inserted between insulating board 62 and plate 10 in order to separate conducting leads 30 and 34 from conducting trigger support member 58. Additional annular insulating rings 82 are inserted on either side of insulating board 62 surrounding respectively axial flange 70 of trigger support member 58 and retaining ring 64.

The arc gap device of FIGURES 1 and 2 may be serially connected by leads 30 and 34 in a circuit for transferring a high current. Such a circuit is illustrated in FIGURE 3. A bank of charged capacitors represented at 105 is connected to a load consisting of a single turn inductance coil 106 by means of closely parallel flat leads represented at 160, serially including the arc gap in the circuit by means of parallel flat leads 30 and 34 intersecting the left lead 160. Leads 30 and 34 are also closely parallel physically as shown in FIGURES 1 and 2. The circuit is for conveying the charge on the capacitor bank to the coil at an accurately predetermined time as governed by trigger electrode 22.

High resistance voltage divider 128 joins leads 30 and 34 and has a tap 130 positioned to provide a quiescent voltage to trigger electrode 22 approximately equal to the voltage of the equipotential surface 134 along which trigger electrode 22 is approximately disposed. A relatively small capacitor 136 having charging terminals 138 and 140 is serially connected with the plate-cathode circuit of thyratron tube 142 and the primary 144 of low impedance transformer 146. The transformer 146 can be constructed with a primary 144 wound with four turns of high voltage cable and a secondary 148 wound with about 24 turns of high voltage cable on a square inch core constructed of 1 mil laminations of silicon steel. This transformer therefore provides an approximate step up ratio of one to six. One end of secondary 148 is returned to one of the conducting plates constituting the arc gap structure while the high voltage end is coupled, through a small capacitor 150 having a value on the order of $1/100$ of a microfarad, to trigger electrode 22.

It has been found desirable to locate trigger electrode 22 half-way between raised portions 12 and 18. At the half-way point, the equipotential surface is substantially flat and the trigger electrode is most effective in initiating a fast discharge between raised portions 12 and 18 without causing premature discharge. With the trigger electrode so located, the tap on the high resistance voltage divider 128 between plates 10 and 16 is set at approximately the half-resistance point.

In order to operate the trigger, the capacitor 136 is first charged to approximately 10 kilovolts. Then a trigger pulse sufficient to fire thyratron tube 142 is applied to grid terminal 152 of thyratron 142 by means of a suitable timing pulse generator (not shown). The ten kilovolt charge on the capacitor immediately discharges through the thyratron and the transformer primary 144 producing a low impedance 60 kilovolt pulse at the secondary 148 having a length on the order of $1/10$ of a microsecond.

When a trigger pulse is applied to trigger electrode 22, an immediate discharge takes place between the extended edge 26 of the trigger electrode and the raised portion of the lower or upper principal electrode depending upon the polarity of the trigger pulse. The trigger discharge has been found to initiate the main gap discharge within one-half a microsecond. The speed of operation is attributable among other things to the extended sharp edge 26 provided on the trigger electrode. This edge, however, does not disturb the field between the principal electrodes due to the fact that the trigger electrode is disposed along an equipotential surface between the principal electrodes and is maintained at approximately the voltage of the equipotential surface. Since the edge 26 of the trigger electrode is extended a substantial distance laterally along the equipotential surface, subsequent trigger discharges will take place along the edge at different places and the trigger electrode is not subject to rapid deterioration or burning. Frequent replacements of the trigger electrode are not necessary. Neither are shielding arrangements for the trigger electrode or additional electrodes operated in conjunction with the trigger electrode. Therefore the space between the principal electrodes may be reduced to a minimum with the help of the pressurizing means, resulting in considerable reduction in inductance of the spark gap device.

With the construction according to the specific embodiment of FIGS. 1 and 2, the gap inductance is reduced to the low value of one one-hundredth of a microhenry, and furthermore, the construction permits the attachment of heavy wide leads, forming extensions of plates 10 and 16, thus further reducing the inductance of the system. A minimum of energy will be stored in the magnetic field represented by this small inductance and hence a maximum quantity of energy is deliverable to the system load.

When a low impedance trigger pulse is employed as suggested it has been found that an arc can be initiated with from one-half to full stand-off voltage between the principal electrodes. This is also attributable to the effectiveness of the trigger electrode.

The embodiment of FIGURES 4, 5 and 6 is a double-trigger gap according to the present invention. The double-trigger apparatus is particularly adapted for establishing an arc between raised portions 12 and 18 when the voltage therebetween is, at least for the moment, considerably less than the maximum standoff voltage of the gap. The embodiment of FIGS. 4, 5 and 6 is substantially the same in construction as the embodiment of FIGS. 1 and 2 in respect to like portions generally referred to by like reference numerals, with those changes and additions hereinafter set out. The apparatus of FIGURE 4 is provided with an additional trigger electrode 84, annular in shape and being tapered to an edge 86 oriented toward gap space 20. Additional trigger electrode 84 is disposed along an equipotential surface which may be located between first trigger electrode 22 and raised portion 12 of conducting plate 10. Trigger electrode 84 is supported by and may be formed as a continuation of flared conducting tubular member 88 having an increasing diameter near gap 20 to present a curved surface opposite the rounded edge of raised portion 12. Flared tubular member 88 is threaded at its opposite end to engage threaded opening 90 in conducting plate 92 having rounded edges 93. Tubular member 88 has a shoulder 104 adjacent its threaded end abutting against the edge of opening 90 to insure accurate positioning of electrode 84. Conducting plate 92 acts as a support for trigger electrode 84 as well as a conducting medium for coupling a trigger pulse to electrode 84. Conducting plate 92 has an annular axial flange 94 extending from both faces thereof for engaging insulating boards 62 and 96, respectively, which may be conveniently composed of ⅜ inch glass cloth laminate impregnated with plastic as hereinbefore set out in respect to board 38. Insulating board 96 separates flange 94 from retaining ring 64. A pair of annular insulating rings 98 composed of a phenolic compound are disposed on either side of insulating board 96 and abutting retaining ring 64 and the outside edges of flange 94 and conducting plate 92. The inner edge of flange 94 tapers inwardly toward insulating boards 62 and 96 to grasp O-ring seals 100, constructed of an appropriate sealing material similar to the O-rings of the previous embodiment. Insulating board 96 has a central opening spaced from tubular member 88, preferably by a margin greater than the spark gap spacing at 20. Conducting plate 92 is provided with a number of vents 102 opened therethrough just outside the diameter threaded opening 90 for the purpose of equalizing the pressure on each side thereof.

In this embodiment post 54 is decreased somewhat in diameter in the neighborhood of tubular member 88 to allow greater spacing and hence better electrical insulating characteristics therebetween. Post 54 increases in diameter as it approaches both trigger electrode 22 and trigger support member 58 where such increase does not materially affect such spacing but reinforces the post structurally. To maintain a similar spacing between trigger electrode 22 and trigger electrode 84 for prevention of arcing therebetween, trigger electrode 22 is somewhat flattened on the side facing electrode 84 while maintaining primarily a tapered wedge shape in the direction of arc gap 20. Both the edge 26 of trigger electrode 22 and the edge 86 of trigger electrode 84 are arranged to have an outside edge maintained in a substantially constant spaced relationship to raised portions 12 and 18, which form the principal arcing electrodes. The gap area of the device shown in FIGURES 4, 5 and 6 may be pressurized by attaching some pressurizing device to tube 52.

In the arrangement of FIGURE 4 it has been found desirable to axially space triggering electrode 84 closer to raised portion 12. For example, trigger electrode 84 may be positioned along an equipotential surface one-third of the way from raised portion 12 toward raised portion 18 while trigger electrode 22 is spaced two-thirds of that distance.

In the arrangement of FIGURES 4, 5 and 6, trigger electrodes 22 and 84 disposed along different equipotential surfaces between raised portions 12 and 18, are supplied with voltages approximately equal to the said equipotential surfaces. With the trigger electrodes spaced ⅓ and ⅔ of the way across the gap, respectively, it has been found that application of simultaneous trigger pulses to both said electrodes will break down the gap 20 with as little as 1/10 the maximum standoff voltage existing across said gap. A need for this feature often arises in alternating current or oscillatory circuits where a maximum standoff spacing is required between principal electrodes to prevent breakdown at the crest of the voltage wave while requiring closure of the circuit across the gap almost at the point where the voltage wave crosses the zero axis. The device shown in FIGURES 4, 5 and 6 will operate to stand off the voltage crest of the wave as determined by the spacing of gap 20, while allowing breakdown near the zero voltage point when a simultaneous trigger pulse applied to both electrodes 22 and 84 through the conducting medium of conducting trigger support member 58 and conducting plate 92. The FIGURE 7 apparatus employs such a two-trigger arrangement for completing a circuit by means of an arc near voltage zero.

The apparatus of FIGURE 7 comprises a pair of spark gap devices arranged back-to-back with one common conducting plate 16, with identical annular raised portions 18 aligned on either side thereof. The bore 57 extends to inner space 47 communicating to the upper arc gap 21 and is threaded at its exit end of 55 to receive a tube 53 connected to an appropriate source of compressed gas at approximately 200 p.s.i. gage. Bore 164 extends to inner space 59 and is similarly provided with a tube 168 which may be connected to a source of gas at approximately 60 p.s.i. gage. The apparatus is otherwise identical to one each of the devices shown in FIGURES 2 and 4 joined by means of a common bottom plate 16, the device from FIGURE 4 being inverted. The internal operation of these spark gap devices and their construction is the same as hereinbefore set out in connection with the individual gaps, and may be employed together in the manner shown for carrying out the method referred to as "crowbarring," hereinafter described.

A relatively large bank of capacitors represented at 105 is connected between conducting plate 11 of the top single-trigger spark gap, and conducting plate 10 of the lower double-trigger spark gap. A single turn inductance coil load 106, is connected from conducting plate 10 of the lower gap to middle conducting plate 16. Although the leads of the capacitor bank 105 and the inductance coil 106 are shown diagrammatically, it is understood that in actual practice parallel plate leads would be brought off as illustrated in the previous embodiments in order to decrease the circuit inductance.

The FIGURE 7 device is adapted for carrying out the following procedure: first, capacitor bank 105 is charged to a relatively high voltage by external means not shown. It is then desired to connect charged capacitor bank 105 directly across inductance coil 106 thereby completing a high circulating current resonant circuit, oscillating at a frequency determined by the capacitor and inductance coil. Ordinarily the current and voltage wave forms in such a circuit after closure are displaced substantially 90 electrical degrees from one another with energy transferring back and forth between the capacitor bank and the inductance coil, in an oscillatory fashion. However, if at almost the moment of complete initial energy transfer from the capacitor bank toward and into the induction coil, the latter is short-circuited, this energy will be entrapped as a circulating current in the coil theoretically providing a greater and steadier flux within the inductance coil. This latter short-circuiting mode of operation is known as "crowbarring."

In the operation of the apparatus of the FIGURE 7 device, the pre-charged capacitor bank 105 is first connected to coil 106 by breaking down the gap 21 between raised portions 12 and 18 of conducting plates 11 and 16, respectively, the return circuit being completed through conducting plate 10 of the lower gap. Trigger electrode 23, normally maintained at the voltage of an equipotential surface along which it lies, is supplied a low impedance trigger pulse on the same order of magnitude as the voltage appearing across capacitor bank 105, triggering is to occur immediately after the ionization of gas or other load preparation within coil 106. After breakdown of gap 21, an oscillatory current starts to flow from capacitor bank 105 to inductance coil 106. When almost all the charge has been transferred from the capacitor bank to the inductance coil, it will be appreciated by those skilled in the art that the voltage across the inductance coil will be nearly zero. At this time the trigger electrodes 22 and 84 of lower gap 20, connected across the said inductance coil 106, are simultaneously pulsed with a voltage having a magnitude on the order of that appearing initially across the capacitor bank, at a time just before the voltage across the inductance coil 106 reaches zero. This triggering pulse almost instantaneously breaks down the gap 20 thereby short-circuiting inductance coil 106 and leaving a high circulating current therein. It is seen that the timing of the discharge of gap 20 is exceedingly important.

Figure 8:
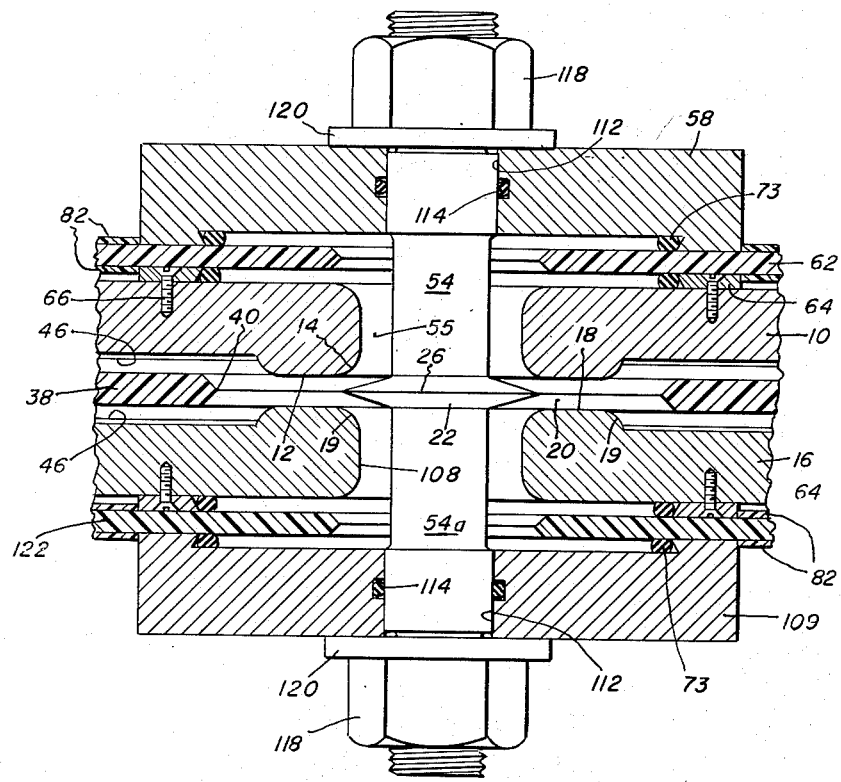
FIGURE 8 is a cross-sectional view of a modification of the invention illustrating an alternative means for clamping the structure together.

The modification of FIGURE 8 possesses improved strength characteristics and permits a decrease in the overall bulk and weight of the spark gap apparatus. The embodiment in FIGURE 8 is substantially the same in general construction and operation as the embodiments previously set out, with a major exception involving the arrangement employed to clamp the device axially together. Conducting post 54 is extended on the opposite side of trigger electrode 22 by an axially aligned extension 54a of similar diameter. Sections 54 and 54a may comprise a unitary shaft of brass material turned to produce tapered trigger electrode 22 at the approximate center. Extension 54a passes through and is spaced from central aperture 108 which has been provided in conducting plate 16. Shaft 54 and its extension fit through matching bores 112 in trigger supporting members 58 and 109 provided with packing seals 114, and are threaded at each end thereof for receiving tightening nuts 118 which bear upon washers 120, respectively abutting trigger support members 58 and 109. Support member 109 is provided with an axial flange inwardly canted to grasp an O-ring seal in a similar manner to that employed for pressure sealing purposes with trigger support member 58. The flange of trigger support member 109 as well as its O-ring seal abut insulating board 122 composed of a material similar to that used for insulating board 38.

The above construction has been found to possess improved strength characteristics under operating conditions since the arc initiated between raised portions 12 and 18 in the spark gaps according to the present invention discharges with an explosive force producing a structural strain on nearby members and tending to flex the trigger electrode. The unitary shaft, 54 and 54a, structurally reinforces the trigger electrode against the explosion of the discharge and further provides simpler and much improved axial clamping against pressure leakage.

In the various previous embodiments, brass has been found to be an electrically and structurally advantageous material for the raised portions 12 and 18 forming the principal electrodes, and for the trigger electrode. The black nitrides that may then be formed by the arc when nitrogen is used as a pressurizing gas are non-conducting. When these black nitrides are deposited on insulating surfaces around the gap, they do not short out the gap, nor do they cause breakdown of the long creepage path provided between the main electrodes.

Many departures from the particular embodiments will occur to those skilled in the art. For example, the raised portions of the conducting plates forming the principal electrodes of the main arc gap have been constructed in an annular configuration, among other reasons, because it facilitates machining. These raised portions may take other configurations, forming a closed loop or not, as may appear convenient, a main consideration however being that a portion of the edge of the trigger electrode be equispaced from the said gap formed by the principal electrodes. Various expedients for pressurizing the apparatus according to the present invention may be employed without departing from the invention. Also use of various other insulating and spacing materials will occur to those skilled in the art.

From the foregoing it will be seen that the present invention provides a high current switching device in which troublesome inductance is reduced to a minimum due to the reduction in gap spacing facilitated by the present invention, and because of the parallel plate construction employed. Furthermore, due to the shape and location of the triggering electrode, switching action may be initiated within half a microsecond, thus answering a requirement for an extremely accurate, high current switching device. Despite the simple construction of the present invention, the triggering electrode is not rapidly consumed by the main arc and the principal arc gap field is not disturbed or prematurely triggered.

While I have shown and described several embodiments of my invention, it will be apparent to those skilled in the art that many changes and modifications may be made without departing from my invention in its broader aspects; and I aim therefore the appended claims to cover all such changes and modifications as fall within the true spirit and scope of my invention.

What I claim as new and desire to secure by Letters Patent of the United States is:

1. Switching apparatus comprising a pair of spaced, opposed, annular arcing electrode surfaces and a trigger electrode located centrally with respect to the annulus positioned longitudinally between said arcing surfaces and having a circular edge adjacent the arc path between said arcing electrode surfaces in a plane substantially parallel to the annular arcing electrode surfaces.

2. Switching apparatus comprising a pair of spaced, opposed, annular arcing electrode surfaces, a unitary trigger electrode positioned longitudinally between said arcing surfaces and having a circular edge tapered radially outward toward the arc path between said arcing electrode surfaces in a plane substantially parallel to the annular arcing electrode surfaces, and means for inclosing said switching apparatus and maintaining a higher than atmospheric pressure in the region of said electrodes.

3. Switching apparatus comprising a pair of spaced, opposed, annular arcing electrode surfaces and first and second triggering electrodes positioned longitudinally between said arcing surfaces and having circular edges tapered radially outward adjacent the arc path between said arcing electrode surfaces in separate planes substantially parallel to the annular arcing electrode surfaces.

4. Switching apparatus comprising: a first principal electrode having a smooth conducting face capable of supporting an electric arc; a second principal electrode having a smooth conducting face in spaced relationship to said face of said first electrode so that both said faces have at least one common normal; a unitary radially outwardly extending trigger electrode lying generally along a surface perpendicular to said normal but substantially clear of the main arc discharge path between said faces, said trigger electrode having a forward edge laterally extended along said surface oriented toward said normal and curved in the plane of said surface so that said edge remains a substantially uniform distance from one of said principal electrodes.

5. Switching apparatus comprising: a first rounded convex principal electrode having a conducting surface capable of supporting an electric arc; a second rounded convex electrode also having a conducting surface facing opposite said first electrode and defining a gap therebetween; said electrodes each having at least a differential area of surface parallel to the other; and a triggering electrode adjacent said gap and lying in a plane between and parallel to said parallel areas of said principal electrodes, said triggering electrode tapering to an outside edge in the direction of said gap.

6. The apparatus of claim 5 wherein the area of said electrode surfaces and said triggering electrode is enclosed and maintained at higher than atmospheric pressure.

7. Switching apparatus comprising: a first convex principal electrode having a conducting surface capable of supporting an electric arc; a second convex electrode also having a conducting surface facing opposite said first electrode and defining a gap therebetween; said electrodes each having at least a differential area of surface parallel to the other; a first triggering electrode adjacent said gap and lying substantially in a plane between and parallel to said parallel areas of said principal electrodes; a second triggering electrode adjacent said gap and lying substantially in a second plane between and parallel to said parallel areas of said principal electrodes; and separate connection means for applying different voltages to said triggering electrodes.

8. Apparatus for completing a circuit for passing high electric currents with a maximum transfer of energy at an accurately predetermined time comprising: means for establishing an electrostatic field with a voltage gradient less than that required to cause an arc breakdown across said field, said field containing a plurality of spaced equipotential surfaces, the concentration of said equipotential surface spacing varying from a relatively closely spaced region of maximum field strength to a greater spacing of lesser field strength; a unitary disc shaped triggering electrode having a forward edge tapered toward said region of maximum field strength and generally extending laterally along one of said equipotential surfaces; and coupling means for normally maintaining said electrode near the quiescent voltage of said equipotential surface along which it is disposed to prevent uncontrolled breakdown of said field at the forward edge of said wedge.

9. Apparatus for completing a circuit for passing high electric currents with a maximum transfer of energy at a predetermined time comprising: a pair of closely spaced parallel conducting plates provided with parallel lead connections for applying a voltage therebetween and each having a smoothly raised portion protruding toward the other with sufficient spacing therebetween to prevent the self-initiation of an arc breakdown, whereby when said voltage is applied an electric field is established between said raised portions containing spaced equipotential surfaces generally parallel to said raised portions and having an area of maximum field intensity where said raised portions are nearest one another; and a unitary tapered triggering electrode oriented toward but laterally displaced from said area of maximum field intensity, said triggering electrode being disposed generally parallel to the nearest equipotential surfaces.

10. The apparatus as set forth in claim 9 wherein the region between said raised portions and including said triggering electrode is pressurized.

11. The apparatus as set forth in claim 9 wherein at least the closest regions of said raised portions and said triggering electrode are composed of brass.

12. Switching apparatus comprising: a pair of parallel conducting plates provided with parallel lead connections for applying a voltage therebetween; parallel opposed raised portions on each of said plates having the shape of similar toroids being formed from opposed curves of cross section rotated about a common axis perpendicular to said plates and defining a gap between said raised portions, thereby establishing, when a voltage is applied between said lead connections, an electric field pattern containing spaced equipotential surfaces generally parallel to said raised portions and having an area of maximum field intensity where said raised portions are nearest one another; a disc-shaped triggering electrode disposed along one of said equipotential surfaces, having a diameter less than the said toroids and positioned on the same axis with said toroids, said triggering electrode being tapered with an edge toward the gap formed between said raised portions; and high voltage insulating means being clear of said raised portions for spacing said plates and providing a high impedance creepage path therebetween.

13. The apparatus as recited in claim 12 wherein said high voltage breakdown insulating means includes a flat insulating plate provided with an aperture larger in diameter than and surrounding said raised portions and wherein said insulating means has an edge tapered toward said gap.

14. A switching apparatus comprising: a pair of parallel conducting plates provided with parallel lead connections for applying a voltage therebetween and each having opposed ring-shaped raised portions protruding toward the other with sufficient spacing therebetween to prevent the self-initiation of an arc breakdown whereby to establish between said raised portions an electric field composed of spaced equipotential surfaces generally parallel to said raised portions and having an area of maximum field intensity where said raised portions are nearest one another; a triggering electrode similar in outline to said raised portions being positioned between the said plates within said rings along one of said equipotential surfaces, said triggering electrode decreasing in thickness with a tapered edge toward said area of maximum field intensity; and means for positioning said triggering electrode with its edge a substantially uniform distance from said raised portions including means for coupling a voltage to said triggering electrode.

15. Switching apparatus comprising: a pair of parallel conducting plates provided with parallel lead connections for applying a voltage therebetween and each having an annular smoothly raised portion protruding toward the other with sufficient spacing therebetween to prevent the self-initiation of an arc breakdown, whereby to establish between said raised portions an electric field containing spaced equipotential surfaces generally parallel to said raised portions and having an area of maximum field intensity where said raised portions are nearest one another; at least one of said plates having an annular aperture in the middle of its annular raised portion; a generally flat triggering electrode similar in shape to said annular raised portions but having a smaller dimension thereacross and provided with a tapered edge; and means extending through said aperture for supporting said triggering electrode along one of said equipotential surfaces, including means for coupling a voltage to said triggering electrode.

16. The apparatus as recited in claim 15 further including insulating means for securing said triggering electrode to both said plates whereby to clamp said apparatus including said plates longitudinally together.

17. A switching apparatus comprising: a pair of parallel conducting plates provided with parallel lead connections for applying a voltage therebetween and each having an annular raised portion protruding toward the other defining a gap therebetween, one of said conducting plates having an aperture within its annular raised portion; a first annular triggering electrode having an outside dimesion thereacross less than said annular raised portions but positioned on the same axis therewith, said triggering electrode being tapered with an edge towards the gap formed between said raised portions; a hollow tubular member joined to said first triggering electrode for supporting said first triggering electrode extending through said aperture; a second disc-shaped triggering electrode having a diameter less than said annular raised portions positioned along the same axis with said raised portions and disposed between said first triggering electrode and the other of said plates; and a post projecting through said tubular member and said first triggering electrode for supporting said second triggering electrode.

18. The apparatus as recited in claim 17 further including an annular raised portion on the opposite side of the other of said plates; a third plate parallel thereto provided with an annular raised portion protruding toward said last mentioned raised portion; and a third triggering electrode having a tapered edge and positioned between said last two mentioned raised portions for initiating an arc discharge therebetween.

References Cited in the file of this patent

UNITED STATES PATENTS

| | | |
|---|---|---|
| 2,228,846 | Prince | Jan. 14, 1941 |
| 2,909,695 | Melhart | Oct. 20, 1959 |
| 2,936,390 | Melhart | May 10, 1960 |